INVENTOR
Roy C. Hobson
BY
Clarence O Kerr
ATTORNEY

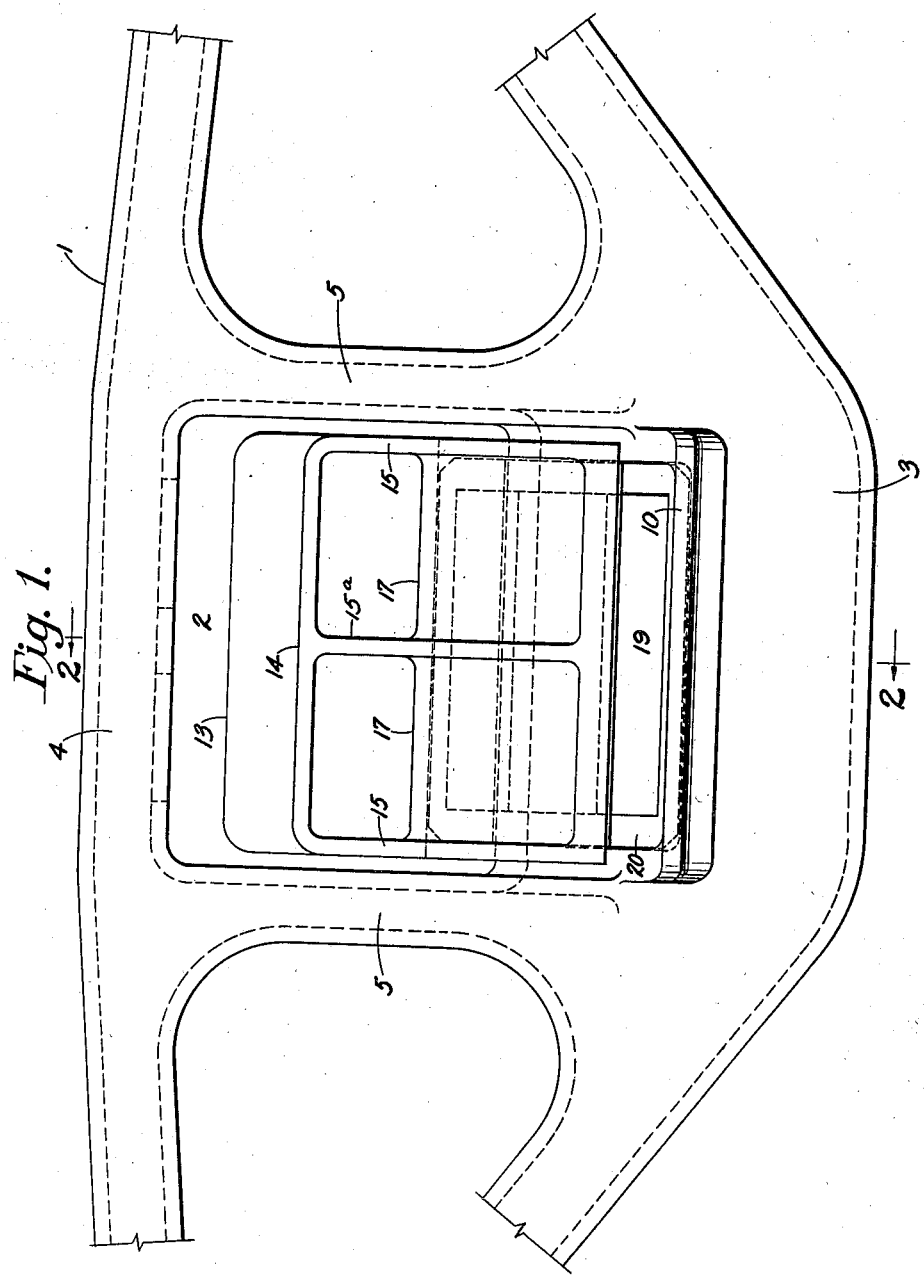

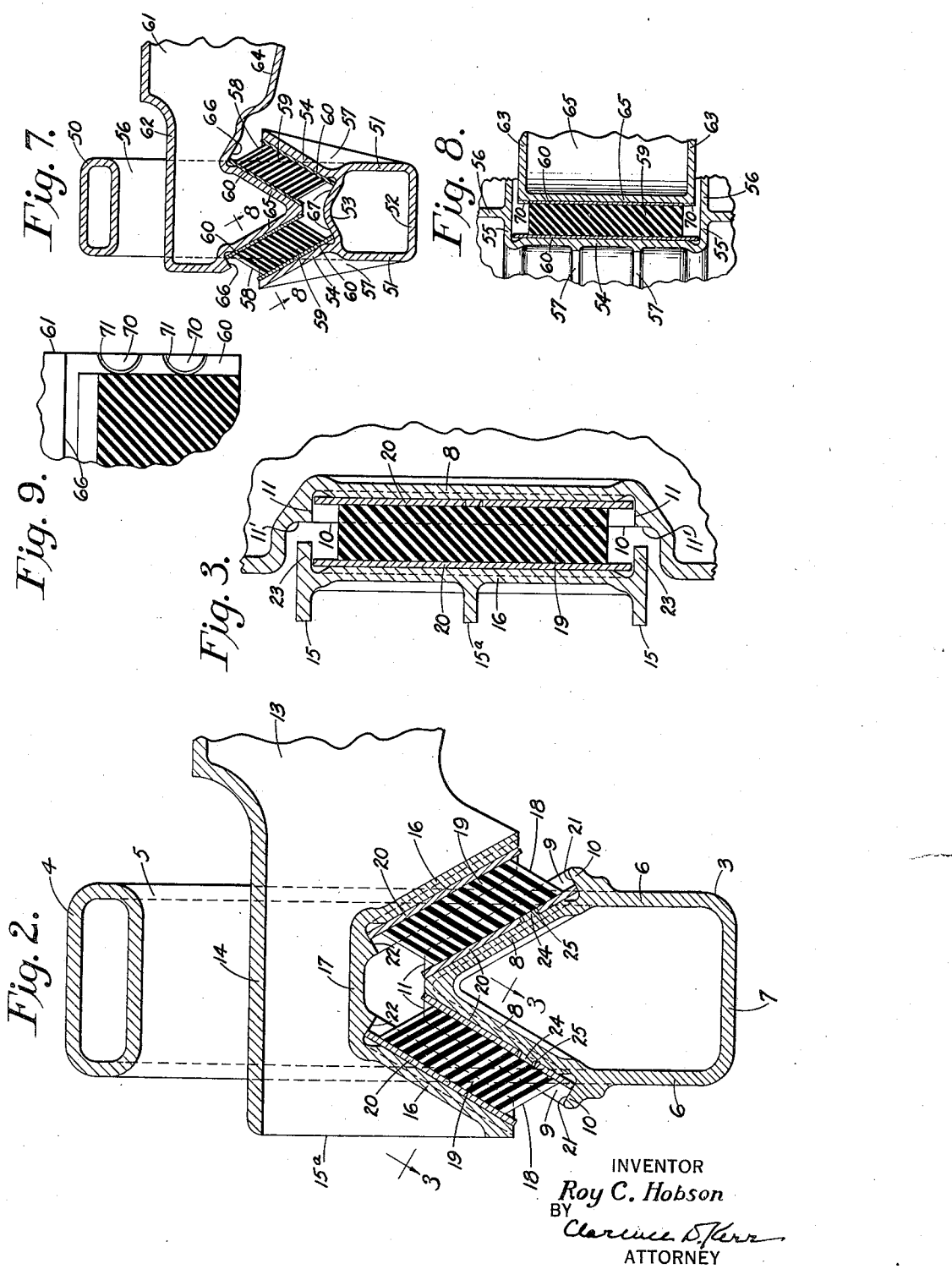

Patented Aug. 13, 1940

2,211,462

UNITED STATES PATENT OFFICE 2,211,462

CAR TRUCK

Roy C. Hobson, Cleveland Heights, Ohio, assignor to National Malleable and Steel Castings Company, Cleveland, Ohio, a corporation of Ohio Application February 10, 1938, Serial No. 189,789

25 Claims. (Cl. 105—197)

This invention pertains to car trucks and more particularly to novel spring suspension involving the use of rubber.

The present trend in railway car trucks, particularly those used in freight service, is to include devices in the spring suspension to prevent the build-up of oscillations of the coil springs to such a point as would result in damage to the lading. These stabilizing mechanisms include devices which may be substituted for one or more of the usual coil springs and in other cases the truck is designed to include built-in friction mechanism to damp the oscillations of the springs. These arrangements are for the most part complicated and involve extra pieces added to the truck and since they rely on friction for their snubbing action they will of course in time wear out.

I have found that by using rubber for the resilient means in the car truck to cushion movements of the bolster, the truck construction can be greatly simplified and a substantial number of parts eliminated. At the same time the resilient suspension can be made adequate to support the loads and prevent the build-up of undesirable oscillations.

An object of my invention is the provision in a car truck of rubber means which alone supports the applied bolster load and having load travel characteristics which cushion movements between the bolster and side frame with the minimum amount of damage to the car lading. Another object of my invention is in the mounting of the resilient means so that the rubber is placed under combined shear and compression during downward movement of the bolster relative to the side frame. A still further object is a rubber cushion mounted on the side frame and cooperating with the bolster to normally maintain the bolster in central position with respect to the side frame and to prevent metal to metal contact between the side frame and bolster. Moreover, my invention contemplates a cushioning mechanism wherein the load applied to the bolster is distributed uniformly over substantially the length of the horizontal portion of the tension member, thus reducing the secondary bending stresses in the side frame and enabling a reduction in the weight thereof. Other objects and advantages of my invention will be better understood from a consideration of the following description and drawings, in which:

Figure 1 is an elevational view of one side of a car truck embodying my invention.

Figure 2 is a vertical sectional view, taken on line 2—2 of Fig. 1.

Figure 3 is a partial sectional view, taken on line 3—3 of Fig. 2.

Figure 7 is a vertical sectional view, taken on line 7—7 of Fig. 6.

Figure 8 is a partial sectional view, taken on line 8—8 of Fig. 7; and

Figure 9 is a partial view of a detail of the invention shown in Figs. 6, 7 and 8.

Figure 6:
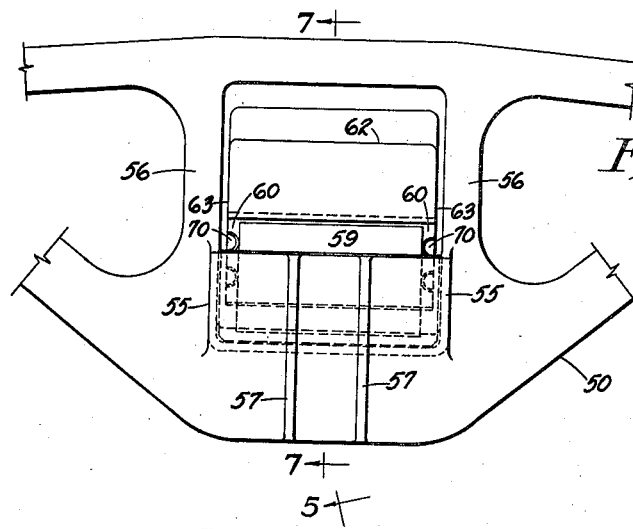
Figure 6 is a side elevation of a still further embodiment of my invention.

Referring to Figs. 1, 2 and 3 the side frame 1 has the usual window opening 2 formed by tension member 3, compression member 4 and columns 5. Tension member 3 in the region of the window opening is formed of side walls 6, bottom wall 7 and converging top walls 8 which meet substantially on the longitudinal center line of the side frame and extend between columns 5. Recesses 9 are formed on the upper sides of each of top walls 8 by bottom flanges 10 and side walls 11.

A bolster 13 has an end portion extending into window opening 2 which end portion comprises top wall 14, side walls 15 and upwardly converging bottom walls 16 corresponding in slope to top walls 8 of the side frame. A horizontal wall 17 joins the upper ends of sloping walls 16 and extends between side walls 15 of the bolster. A rib 15a extending between walls 14 and 16 serves to reinforce the end of the bolster. Positioned in the pocket formed by walls 15, 16 and 17 are resilient units 18 each comprising a rubber element 19 having metal plates 20 bonded to opposite sides thereof. One plate of each unit rests on one of the sloping walls 8 of the side frame and bears at its bottom end against the shoulder 21 formed by flange 10. The other plate of each resilient unit is in engagement with one of the bolster walls 16 and bears at its upper end against a shoulder 22 formed at the junctures of walls 16 and 17. Flanges 23 on the bolster extend downwardly into overlapping relation with the upper plates 20 so as to position the rubber units laterally of the bolster. The lower plates 20 lie between side walls 11 of the recesses 9 in the side frame and position the resilient units longitudinally of the side frame. It will be observed that if the positions of the rubber units were reversed—that is, the one at the right in Fig. 2 were swung through the angle formed between walls 8 and substituted for the one at the left of Fig. 2—the plates 20 would not lie in correct relation to the shoulders 21 and 22. Therefore, in order to prevent improper application of the rubber units I provide means in the form of projections 24 extending outwardly from walls 8 into recess 25 in lower plates 20. Thus, it is impossible to incorrectly apply the resilient units, providing of course they rest directly on upper surfaces of walls 8.

When a load is applied to the bolster a combined compression and shearing stress is set up in the resilient units. Due to the absorption of energy in the rubber, the build-up of detrimental oscillations of the bolster is effectively prevented. Furthermore, movement of the bolster longitudinally of the side frame is resisted by the rubber units after flanges 23 and side walls 11 come into engagement with the respective plates 20 of the resilient units. Further movement of the bolster relative to the side frame after this engagement has taken place will impose a shearing stress on the rubber. Such movements would occur during sudden starting of the car or during brake applications. After the force that caused the movement has been removed the rubber will position the bolster centrally of the window opening. In this manner wear between the bolster and columns is prevented by maintaining them normally out of contact. Lateral movement of the bolster relative to the side frame is resisted by one of the resilient units in each side frame, depending on the direction of said lateral movement. Likewise, any angular or torsional movements between the bolster and side frames are resisted by the rubber units. Thus, when the side frames and bolster are moved out of square, as when passing around curves, they will be returned to normal position when a stretch of straight track is again entered. In short, the resilient units cushion relative movements in any direction between the bolster and side frame and tend to restore these parts to their normal positions after the forces causing the movements have been removed.

The flanges 23 not only position the rubber units laterally of the bolster, but are so spaced from the surfaces 11' adjacent the walls 11 as to engage said surfaces 11' under abnormally severe shocks, thus protecting the rubber units against oversolid blows, whether vertical or in a direction laterally of the side frame.

Figure 4:
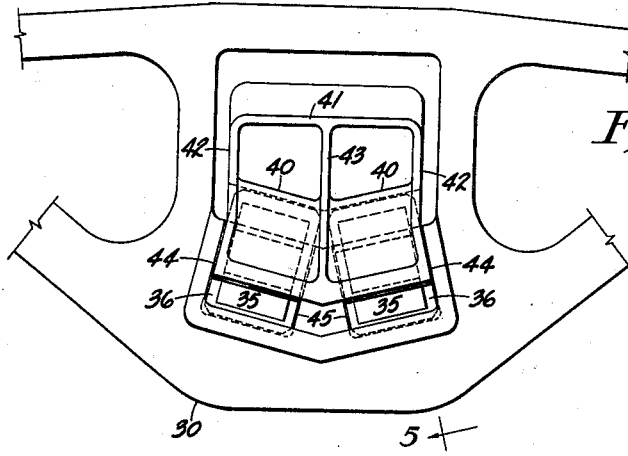
Figure 4 is an elevational view of another embodiment of my invention.
Figure 5:
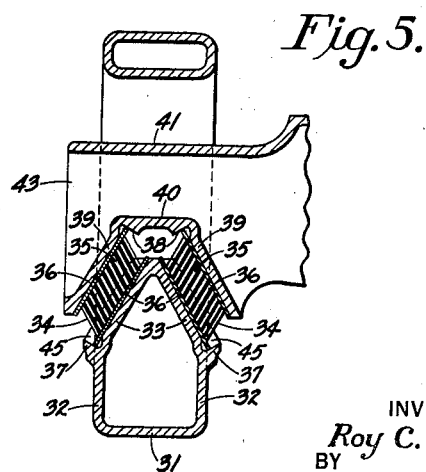
Figure 5 is a vertical sectional view, taken generally along the line 5—5 of Fig. 4.

In the form of the invention shown in Figs. 4 and 5 the tension member of side frame 30 has a bottom wall 31, side walls 32 and pairs of upwardly sloping walls 33 which converge in two directions, both toward the center of the window opening. Thus there is formed a pair of upward projections on each side frame, the two projections being at an angle to each other, each having a pair of resilient units 34 in contact therewith. Each unit is formed of a rubber element 35 having plates 36 joined to opposite sides thereof in the same manner as in the preceding form of the invention. The lower plates bear against flanges 37 forming shoulders on the side frame and the upper plates against shoulders 38 on the bolster formed at the junctures of sloping walls 39 and transverse walls 40. Surfaces 44 and 45 on the side frame position and limit movement of the resilient units longitudinally of the side frame. The bolster also has top wall 41 and side walls 42 joining the top wall with sloping walls 39. A rib 43 also extends between walls 39 and 41 to reinforce the bolster. By positioning the pairs of rubber units at an angle to each other, as viewed in Fig. 4, greater stability is obtained toward movement of the bolster longitudinally of the side frame.

In the form of the invention shown in Figs. 6 to 9, inclusive, the pocket receiving the rubber unit is formed in the side frame instead of the bolster, and the wedge-shape projection extends downwardly from the bolster instead of upwardly from the side frame. The side frame 50 comprises a tension member having side walls 51, bottom wall 52 and top wall 53. Projecting upwardly and outwardly from top wall 53 are walls 54 forming a pocket receiving the rubber units. Side walls 55 join the ends of walls 54 with the side frame columns 56. Reinforcing ribs 57 serve to additionally tie walls 51 and 54 together. As in the previous embodiments, each resilient unit 58 comprises a rubber element 59 having bonded on opposite sides thereof metal plates 60. The bolster 61 comprises a top wall 62, side walls 63 and bottom wall 64. At each end of the bolster are downwardly converging walls 65 which rest on upper plates 60 of the rubber units. These upper plates bear at one end against shoulders 66 on the bolster, whereas the lower plates of the resilient units bear against shoulders 67 formed by top wall 53 of the tension member. The rubber units are positioned longitudinally of the side frame by side walls 55 and columns 56, as will be clear from Fig. 8. Instead of using flanges on the bolster to position the latter with respect to the resilient unit as is done in the embodiment shown in Figs. 1 and 2, this may be accomplished by downward projections 70 on the bolster extending into slots 71 in the upper spring plate 60. Relative movement of the bolster longitudinally of the side frame is thus resisted by the resilient unit through contact between projections 70 with the walls of slots 71. In this embodiment, as in the other two preceding, the rubber units have applied thereto combined compression and shear stresses to resist downward movement of the bolster. Likewise, lateral and longitudinal movement of the bolster relative to the side frame is resisted by the rubber units.

If desired, projections similar to the projections 70 of Fig. 9 may be provided on the bolster walls 39 in Figures 4 and 5 for engagement with openings in the adjacent plates 36 to positively position the rubber units laterally with respect to the bolster, although it will be noted that relative lateral movement between the bolster and said units is resisted by the angular relation between said walls 39.

To dismantle the side frame in any of the embodiments herein shown, the bolster is first jacked up to the top of the window opening, after which the rubber units are taken out, permitting withdrawal of the side frame from the bolster. It is of course understood that the wedges and brasses in the journal boxes at each end of the side frame must be removed before the latter can be withdrawn from the bolster. While my invention has been described in connection with only one side frame and associated end of the bolster, it will be understood that in each case a similar side frame at the opposite end of the bolster cooperates therewith in a like manner to that described.

The angle between the rubber units may be varied to obtain different load travel characteristics. In the embodiments shown in this application the angle is 60° which is suitable for a 50-ton freight car. For a 40-ton car an angle of 55° between rubber units results in substantially the same travel of the bolster for the 40-ton load as the bolster travel in a 50-ton car with the 60° angle. Likewise, for increased loads as in a 70-ton car the angle is increased to around 70° between the rubber units. Further variations may be made in the resilient units by substituting different types of rubber to increase or decrease the stiffness thereof. Moreover, the opposite sides of the rubber units need not be parallel but may be at an angle to each other in which case the plates bonded to these sides will also diverge or converge as the case may be. When the plates of the resilient units are angularly arranged with respect to each other the sloping walls on the bolster and side frame should be changed accordingly.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. In a car truck, a side frame and a bolster having opposed sloping walls, rubber means between said walls, said means being adapted to receive both compression and shearing stresses throughout substantially the entire extent thereof upon downward movement of said bolster relative to said side frame to support said bolster.

2. In a car truck, a side frame and a bolster having walls opposing each other that are inclined to the vertical in the same general direction, rubber means between said walls, said means being positioned at an angle to said side frame and adapted to receive compression and shearing stresses throughout substantially the entire extent thereof upon downward movement of said bolster relative to said side frame to support said bolster.

3. In a car truck, a side frame having a window opening, a bolster having a portion extending into said opening, rubber means in said opening acting in compression and shear throughout substantially the entire extent thereof for supporting said bolster on said side frame, said means being adapted to cooperate with said bolster and side frame for cushioning movement of said bolster laterally of said side frame.

4. In a car truck, a side frame having a window opening, a bolster having a portion extending into said opening, rubber means in said opening acting in compression and shear throughout substantially the entire extent thereof for supporting said bolster on said side frame, said means being adapted to cooperate with said bolster and side frame for cushioning movement of said bolster longitudinally of said side frame.

5. In a car truck, a side frame having a window opening, a bolster having a portion extending into said opening, rubber means in said opening acting in compression and shear throughout substantially the entire extent thereof for supporting said bolster on said side frame, said means being adapted to coperate with said bolster and side frame for cushioning movement of said bolster laterally and longitudinally of said side frame.

6. In a car truck, a side frame having a window opening, a bolster having an end received in said opening, and rubber means rectangular in cross-section in said opening between said side frame and bolster and positioned at an angle to said side frame for supporting said bolster, said means being adapted to receive compression and shearing stresses throughout substantially the entire extent thereof.

7. In a car truck, a side frame member and a bolster member, one of said members having a pocket formed therein and the other of said members having a projection comprising walls intersecting a vertical plane extending longitudinally of said side frame, said projection extending toward said pocket, and rubber means in said pocket and engaging said projection for supporting said bolster on said side frame.

8. In a car truck, a side frame member and a bolster member, one of said members having walls sloping at an acute angle to the central vertical longitudinal plane of said side frame and forming a pocket, the other of said members having intersecting sloping walls in vertical overlapping relation to said first named walls forming a projection extending toward said pocket, and rubber means engaging said walls for supporting said bolster on said side frame.

9. In a car truck, a side frame having a tension member and columns forming a window opening, a bolster in said opening, means on said side frame extending between said columns at an angle to said tension member and projecting upwardly in said opening toward said bolster, and rubber means between said projecting means and bolster and acting in combined compression and shear for supporting said bolster.

10. In a car truck, a side frame having tension and compression members and columns forming a window opening, said tension member having upwardly sloping walls, a bolster in said opening having sloping walls spaced from said tension member walls, and rubber means between said walls acting in compression and shear for supporting said bolster.

11. In a car truck, a side frame having tension and compression members and columns forming a window opening, said tension member having walls sloping upwardly towards the longitudinal center line of said side frame, a bolster in said opening having oppositely sloping walls spaced from said tension member walls, and rubber means between said walls for supporting said bolster.

12. A side frame for car truck comprising tension and compression members and columns, said tension member having a pair of walls sloping transversely thereof in opposite directions within the confines of the width of said tension member, said walls being constructed and arranged to receive rubber means for supporting a bolster when the latter is assembled with said side frame.

13. A side frame for car truck comprising tension and compression members and columns forming a window opening therebetween, said tension member in the region of said window opening comprising a bottom wall and side walls extending upwardly therefrom, and walls sloping transversely of said side frame from the upper ends of said side walls into said window opening, said sloping walls forming seats for cushioning means substantially within the confines of said side walls and being adapted to support the cushioning means of said truck.

14. In a car truck, a side frame having a tension member, said member having walls sloping upwardly and outwardly transversely of said side frame, a bolster having a wedge shaped projection extending downwardly from the bottom thereof, and rubber means engaging said walls and projection for cushioning relative movement between said side frame and bolster.

15. In a car truck, a side frame having a tension member, said member having walls sloping upwardly and outwardly transversely of said side frame, a bolster having a wedge shaped projection extending downwardly from the bottom thereof, and rubber means engaging said walls and projection and acting in compression and shear for cushioning relative movement between said side frame and bolster.

16. A side frame for car truck comprising tension and compression members and connecting columns forming a window opening, said tension member having walls sloping transversely thereof, upwardly and outwardly from the bottom of said window opening, said walls being constructed and arranged to receive rubber means for supporting a bolster when the latter is assembled with said side frame.

17. In a car truck, a side frame having a tension member, said member having walls sloping upwardly towards the longitudinal center line of said side frame, flanges at the bottoms of said walls sloping upwardly towards the ends of said side frame, a bolster in said side frame having sloping walls spaced from said tension member walls, and rubber means between said walls and in engagement with said flanges for supporting said bolster.

18. In a car truck, a side frame having a tension member, said member having walls sloping upwardly towards the longitudinal center line of said side frame, flanges at the bottoms of said walls sloping upwardly towards the ends of said side frame, a bolster in said side frame having sloping walls spaced from said tension member walls, and rubber means acting in compression and shear between said walls and in engagement with said flanges for supporting said bolster.

19. In a car truck, a side frame having a tension member, said tension member having walls sloping upwardly towards the longitudinal center line of said side frame, flanges at the bottoms of said walls sloping upwardly towards the ends of said side frame, said walls and flanges being constructed and arranged to receive rubber means for supporting a bolster when the latter is assembled with said side frame.

20. In a car truck, a side frame and a bolster, rubber means rectangular in cross section between said side frame and bolster positioned bodily at an acute angle to the vertical longitudinal center plane of said side frame so as to act in compression and shear for supporting said bolster on said side frame, and means on said side frame and bolster limiting relative movement between said rubber means and said members.

21. A car truck bolster comprising top, bottom and side walls, an end portion of said bolster having walls converging upwardly with respect to said bottom wall and adapted to position rubber cushioning means parallel to said walls when said cushioning means is assembled with said bolster.

22. A car truck bolster comprising top, bottom and side walls, an end portion of said bolster having walls sloping upwardly toward each other from said bottom wall, and forming a pocket, said pocket being adapted to recive rubber cushioning means substantially entirely therein.

23. A car truck bolster comprising top, bottom and side walls, an end portion of said bolster having walls sloping upwardly toward each other from said bottom wall and adapted to receive rubber cushioning means therebetween when said means is assembled with said bolster, and said walls having flanges projecting downwardly therefrom and adapted to position the cushioning means.

24. In a car truck, a pair of side frames, a bolster, and means whereby said bolster ties said side frames together, said means comprising elements interposed between said bolster and said side frames and subject to a shearing action for cushioning vertical movements of the bolster.

25. In a car truck, a side frame having tension and compression members and columns forming a window opening, said tension member having walls sloping upwardly towards the longitudinal center line of said side frame, a bolster in said opening having oppositely sloping walls spaced from said tension member walls, and rubber means between said walls for supporting said bolster, and means comprising surfaces adjacent the sloping walls of said bolster and side frame respectively for protecting said rubber means against oversolid blows.

ROY C. HOBSON.